(12) United States Patent
Dudás et al.

(10) Patent No.: US 11,634,624 B2
(45) Date of Patent: *Apr. 25, 2023

(54) SURFACTANTS FOR ENHANCED OIL RECOVERY

(71) Applicant: MOL MAGYAR OLAJ- ÉS GÁZIPARI NYILVÁNOSAN MŰKÖDŐ RÉSZVÉNYTÁRSASÁG, Budapest (HU)

(72) Inventors: József Dudás, Veszprém (HU); Sándor Puskás, Szeged (HU); Árpád Vágó, Kiskunhalas (HU); László Bartha, Veszprém (HU); Roland Nagy, Sóly (HU); Mária Törö, Budapest (HU); István Lakatos, Miskolc (HU)

(73) Assignee: MOL MAGYAR OLAJ- ÉS GÁZIPARI NYILVÁNOSAN MŰKÖDŐ RÉSZVÉNYTÁRSASÁG, Budapest (HU)

( * ) Notice: Subject to any disclaimer, the term of this patent is extended or adjusted under 35 U.S.C. 154(b) by 59 days.

This patent is subject to a terminal disclaimer.

(21) Appl. No.: 17/042,427

(22) PCT Filed: Mar. 28, 2019

(86) PCT No.: PCT/HU2019/050014
§ 371 (c)(1),
(2) Date: Sep. 28, 2020

(87) PCT Pub. No.: WO2019/186219
PCT Pub. Date: Oct. 3, 2019

(65) Prior Publication Data
US 2021/0122968 A1   Apr. 29, 2021

(30) Foreign Application Priority Data

Mar. 29, 2018 (HU) .................................. P1800110
Mar. 27, 2019 (HU) .................................. P1900094

(51) Int. Cl.
*C09K 8/584* (2006.01)
*C09K 8/60* (2006.01)

(52) U.S. Cl.
CPC .............. *C09K 8/584* (2013.01); *C09K 8/602* (2013.01); *C09K 2208/06* (2013.01)

(58) Field of Classification Search
CPC .... C09K 8/584; C09K 8/602; C09K 2208/06; C09K 8/52
See application file for complete search history.

(56) References Cited

U.S. PATENT DOCUMENTS

| 3,142,662 | A | * | 7/1964 | Huffman | ................ | C08G 69/42 |
| | | | | | | 528/323 |
| 4,292,035 | A | * | 9/1981 | Battrell | ................ | C11D 3/126 |
| | | | | | | 510/516 |

(Continued)

OTHER PUBLICATIONS

Shahzad (Shahzad, K.M., A review of gemini surfactants: potential Application in enhanced oil recovery, Journal of Surfactants and Detergents, 2015, 19, 223-236).*
Negin et al.: "Most common surfactants employed in chemical enhanced oil recovery", Petroleum, 2017, vol. 3, pp. 197-211.
Sheng: "Status of surfactant EOR technology", Petroleum, 2015, vol. 1, pp. 97-105.
Brycki et al.: "Multifunctional Gemini Surfactants: Structure, Synthesis, Properties and Applications", InTechOpen, 2014, Application and Characterization of Surfactants, Chapter 4, pp. 97-155.

(Continued)

*Primary Examiner* — Kumar R Bhushan
(74) *Attorney, Agent, or Firm* — Jason D. Voight

(57) ABSTRACT

The anionic cocogem surfactant of formula (I) for an oil production process of increased efficiency

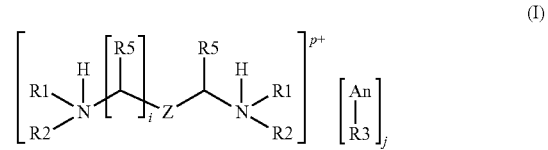

(I)

wherein
each R1 and R2 is independently selected from hydrogen or C1-C18 straight or branched alkyl optionally substituted by OH;
each R3 is independently selected from hydrogen; C1-C25 straight or branched alkyl or alkenyl optionally comprising inter-chain amido-group; aromatic group optionally substituted by C1-C25, preferably C5-C20, more preferably C5-C15 straight or branched alkyl, preferably selected from phenyl and diphenylether; or C10-C20 straight or branched alkenyl, alkadienyl or alkatrienyl;
Z is C1-C18 straight or branched alkylene optionally substituted by one or two C1-C6 alkyl or preferably C3-C6 cycloalkyl, optionally comprising $(EO)_n$ and/or $(PO)_m$ groups, wherein EO is ethylene-oxide i.e. —$CH_2CH_2O$—, and PO is propylene-oxide, i.e. —$CH(CH_3)CH_2O$—, wherein n and m is independently an integer of from 0 to 30 and n+m is an integer of from 1 to 30; and/or $[NH(R4)]^+$ quaternary ammonium, wherein R4 is hydrogen, C1-C6 alkyl, preferably methyl or ethyl;
R5 is hydrogen or C1-C6 alkyl, preferably methyl or ethyl;
An is one or more groups selected from $SO_3^-$, $Cl^-$ or $CO_2^-$;
i is an integer of 0 or 1;
p is an integer of 2 or 3;
j is an integer of 2 or 3.

11 Claims, No Drawings

(56) References Cited

U.S. PATENT DOCUMENTS

| | | | | |
|---|---|---|---|---|
| 4,303,543 | A | * | 12/1981 | Mansy ................ C11D 17/006 510/159 |
| 4,960,526 | A | * | 10/1990 | Puentes-Bravo ....... C11D 11/02 510/306 |
| 8,372,304 | B2 | * | 2/2013 | Yamada .................. C09G 1/02 438/693 |

OTHER PUBLICATIONS

Antonietti et al.: "Microemulsion Polymerization: New Surfactant Systems by Counterion Variation", Adv. Mater., 1996, vol. 8, No. 10, pp. 840-844.

Faul et al.: "Ionic Self-Assembly: Facile Synthesis of Supramolecular Materials", Adv. Mater., 2003, vol. 15, No. 9, pp. 673-683.

Noori et al.: "Synthesis and Investigation of Surface Active Properties of Counterion Coupled Gemini Surfactants", J Surfact Deterg, 2014, vol. 17, pp. 409-417.

Noori et al.: "Interfacial and Solution Behavior of Amphiphilic Drug and Counterion-Coupled Gemini (COCOGEM) Surfactants", J Surfact Deterg, 2015, vol. 18, pp. 55-66.

Páhi et al.: "Thermodynamics of Micelle Formation of the Counterion Coupled Gemini Surfactant Bis(4-(2-dodecyl) benzenesulfonate)-Jeffamine Salt and Its Dynamic Adsorption on Sandstone", J. Phys. Chem. B, 2008, vol. 112, No. 48, pp. 15320-15326.

Puskás et al.: "First Surfactant-Polymer EOR Injectivity Test in the Algyö Field, Hungary", 19th European Symposium on Improved Oil Recovery, 2017, Stavanger, Norway.

Puskás et al.: "Surfactant-Polymer Enhanced Oil Recovery Experiment in Algyö Field the Injectivity Test", International Oil and Gas Conference and Exhibition, 2017, Siófok.

Muhammad Shahzad Kamal: "A Review of Gemini Surfactants: Potential Application in Enhanced Oil Recovery", J Surfact Deterg, 2016, vol. 19, No. 2, pp. 223-236.

* cited by examiner

SURFACTANTS FOR ENHANCED OIL RECOVERY

This is the national stage of International Application PCT/HU2019/050014, filed Mar. 28, 2019.

The present invention relates to cocogem surfactants for an enhanced oil recovery process, said surfactants exhibit reduced critical concentration for micelle formation and thermal stability under conditions typical of deeper oil storage layers (e.g. higher temperature, pressure and/or salinity) as compared to the prior art. Furthermore, said cocogem surfactants provide reduced water-to-oil interfacial tension as compared to the prior art. The invention also relates to a process for producing said cocogem surfactants.

THE STATE OF THE ART

Gemini surfactants are types of molecules having two hydrophilic and two hydrophobic groups. The two surfactant monomers are bonded together via a chemical bond by a small group, the so-called. "spacer". Gemini surfactants, like conventional surfactants, may have anionic, cationic, and nonionic properties, but have very different properties. The most important difference is that the critical concentration for micelle formation of gemini surfactants (hereinafter referred to as CMC, Critical Micelle Concentration) is one or two orders of magnitude smaller than the monomeric surfactants with the corresponding composition or structure. Therefore, in a given application area, significantly less gemini surfactants can achieve the same surfactant effect than the analog normal, i.e. monomeric surfactant. Due to the different attachments of hydrophilic groups, the CMC values are also different. The CMC can also be changed by increasing the number of spacer carbon atom. The applicability of classical gemini tensides in enhanced oil recovery processes (hereinafter referred to as EOR) is summarized by Muhammad Shahzad Kamal (A Review of Gemini Surfactants: Potential Application in Enhanced Oil Recovery, Journal of Surfactants and Detergents, March 2016, Volume 19, Issue 2, pp 223-236).

A further overview of these classical gemini surfactants is provided by Bogumil E. Brycki et al. (Multifunctional Gemini Surfactants: Structure, Synthesis, Properties and Applications, InTechOpen, Application and Characterization of Surfactants, editor: ReZa Najar, Chapter 4, (2017) pp 97-155). The publication mentions, among other things, that gemini surfactants can be characterized by a magnitude lower (dozen times lower) of CMC interfacial tension than the corresponding surfactant monomers. The publication also refers to the use of classical gemini surfactants in EOR technology, however, does not mention cocogem surfactants.

In recent years, a very low number of new type of surfactants have been published in the literature related to surfactants, the structure of which differs from the classical gemini surfactants (where the dimeric structure is formed by covalent bonds), in that here a very strong ionic bond as counterion pair creates the desired gemini structure. Surfactants, designated as counter-coupled gemini, form a definite solid micellar system in their aqueous solutions, with very low CMC and very low IFT (oil-water interfacial tension) values. These ion-pair type of compounds, in which two or more surfactant groups can be attached, have a geometrically well-defined symmetric structure. Like gemini surfactants, we can also distinguish between cationic and anionic ones. In our research, we focused on anionic cocogem surfactants, because the chemical-physical properties of these compounds best meet the requirements of EOR technology (low CMC and IFT values, hydro- and thermal stability at high layer temperatures, etc.).

M. Antonietti et al. (Adv. Mater. (1996) vol. 8, no. 10, pp. 840-844) discloses a surfactant material system, which makes it possible to form polymerisable microemulsions. The essence of the solution is that the geometry and polarity of a particular surfactant can be modified by electrostatically coupling it with an appropriate organic counterion. Similarly, M. Antonietti et al. (Adv. Mater. 15 (2003) vol. 15, no. 9, pp. 673-683) described a technique based on ionic self-organization, which is based on the creation of new chemical entities, nanostructures by electrostatic interactions from structurally different building elements.

Sahar Noon et al. in two publications (J Surfact Deterg (2014) vol. 17 pp. 409-417 and J Surfact Deterg (2015) vol. 18, pp. 55-66) disclose three different cocogem surfactants and their physico-chemical properties (e.g. interfacial tension data, CMC value) among 1,6-bis(N,N-alkyl-dimethyl-ammonium-adipate compounds. The compounds disclosed herein are structurally different from the cocogem surfactants of the present invention, since as the counterion not diamines or triamines bind two monomeric surfactant molecules, but two ammonium derivatives are combined by a dicarboxylic acid molecule, which is adipic acid. The use of the compounds in EOR technology is not mentioned in the publications.

Chegenizadeh Negin et al. [Petroleum (2017) vol. 3, no. 2, pp. 197-211] provide an overview of the most common surfactants used in chemical EOR technology. The document cited discloses that the use of surfactants for this purpose is intended to modify the wetting characteristics and to reduce the interfacial tension. The EOR technology can be made more efficient by using suitable surfactants for the environmental variables of the oil storage layer (e.g. pressure, temperature, salinity). The document, among other materials, also discloses gemini surfactants which, however, are not cocogem tensides (https://www.sciencedirect.com/science/article/pii/S2405656116300621).

James J. Sheng's publication [Petroleum (2015) vol. 1, no. 2, pp. 97-105] is also a summary of the surfactants used in EOR technology. The documentation referred to also reveals the requirements for surfactants that can be used in EOR technology (e.g. reducing interfacial tension, changing wetting properties), and mentions the importance of environmental variables for oil storage layers. The referenced document does not disclose cocogem surfactants (https://www.sciencedirect.com/science/article/pii/S2405656115000334).

In a further publication (MOL Miner Newsletter), Sándor Puskás mentions studies on the oil industrial applicability of various structural types of gemini and new type ("smart" or "super") surfactants, and their mixtures with non-ionic surfactants, but does not disclose the structure of the new type of surfactants.

Barbara Annamaria Páhi et al. J. Phys. Chem. B (2008) vol. 112, no. 48, pp. 15320-15326) disclosed an anionic cocogem surfactant, bis(4-(2-dodecyl)benzene-sulphonate)-Jeffamine salt (DBSJ) produced by a 2:1 stoichiometric reaction of 4-(2-dodecyl)benzene-sulphonic acid and poly (propylene-glycol)-bis(2-aminopropyl)-ether Jeffamine D230). There is no information about the practice testing of the compound according to the publication in the paper. Both the compounds as described in the prior art, and the compounds according to the present invention, which have different structures, have been tested, and it has been demonstrated that cocogem surfactants with similar basic skeleton to that of the state of the art, but with significantly different structure can be advantageously used. The known compound was excluded from the scope of the protection according to the present invention.

Sándor Puskás et al., in several publications (19th European Symposium on Improved Oil Recovery, Stavanger, Norway, Apr. 24-27, 2017; International Oil and Gas Conference and Exhibition, Siófok, 5-6 Oct., 2017) summarized the requirements against surfactants, which are applicable in tertiary oil production. [i.e., thermal stability and efficiency at low concentration under the conditions of the oil storage layer (95-100° C.); low CMC value, ability to significantly reduce the interfacial tension between the oil-water phases]. In addition, reference is made to methods for selecting surfactants meeting the above requirements (e.g., testing of the water solubility, interfacial tension, CMC and IFT values, determination of adsorption capacity, interaction, synergistic effect of surfactants and cotensides, effects)./science/article/pii/S2405656115000334).

The Problem to be Solved by the Present Invention

The technical problem to be solved by the present invention is to provide cocogem surfactants for tertiary oil recovery processes, said cocogem surfactants
a) exhibit a critical concentration for micelle formation lower than the prior art surfactants;
b) show thermal stability; and
c) provide reduced water-to-oil interfacial tension
within circumstances characteristic for deeper oil storage layers (e.g. higher temperature, pressure and/or salinity).

The Discovery According to the Present Invention

To achieve the above-mentioned objective, we have carried out systematic experimental work, which has resulted in our invention. The present invention is based on the discovery that the achievement of the stated technical objectives can be ensured by the cocogem surfactants of the present invention.

BRIEF DESCRIPTION OF THE INVENTION

1. An anionic cocogem surfactant according to the general formula (I) for an enhanced oil recovery process

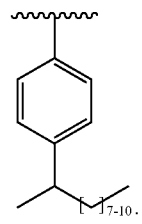
(I)

wherein
each R1 and R2 is independently selected from hydrogen; or straight or branched chain alkyl having from 1 to 18 carbon atoms, optionally substituted with hydroxy;
each R3 is independently selected from hydrogen; straight or branched chain alkyl or alkenyl group having from 1 to 25 carbon atoms, optionally containing an interchain amido group; an aromatic group optionally substituted with straight or branched chain alkyl having 1 to 25, preferably 5 to 20, more preferably 5 to 15 carbon atoms, said aromatic group preferably selected from the group consisting of phenyl and diphenyl ether; or a straight or branched alkenyl, alkadienyl or alkatrienyl group having 10 to 20 carbon atoms;

Z is a straight or branched chain alkylene group having 1 to 18 carbon atoms, optionally substituted with one or two alkyl having 1 to 6 carbon atoms, or preferably cycloalkyl having 3 to 6 carbon atoms, optionally containing $(EO)_n$ and/or $(PO)_m$ groups, wherein EO is ethylene oxide, i.e. $-CH_2CH_2O-$, and PO is propylene oxide, i.e. $-CH(CH_3)CH_2O-$, wherein n and m are independently integers from 0 to 30 and n+m is an integer from 1 to 30; and/or $[NH(R4)]^+$ quaternary ammonium, wherein R4 is hydrogen, alkyl having 1 to 6 carbon atoms, preferably methyl or ethyl;
R5 is hydrogen or alkyl having 1 to 6 carbon atoms, preferably methyl or ethyl;
An is one or more groups selected from the group consisting of $SO_3^-$, $Cl^-$ or $CO_2^-$;
i is an integer of 0 or 1;
p is an integer of 2 or 3;
j is an integer of 2 or 3;
with the proviso that when
R1 and R2 are both H; and
Z is $(PO)_m-CH_2$, wherein m is 1 to 5, and
i is 0; and
R5 is methyl; and
An is $SO_3^-$;
then R3 is other than the following group

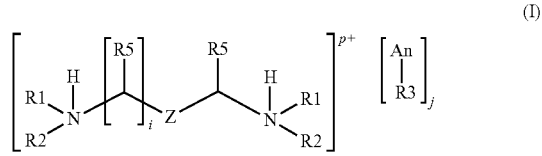

2. The cocogem surfactant of formula (I) according to Point 1, wherein each of R1 and R2 is independently selected from hydrogen; or straight or branched chain alkyl having 1 to 8 carbon atoms, or straight chain alkyl having 1 to 3 carbon atoms, substituted with hydroxy.
3. The cocogem surfactant of formula (I) according to Point 1 or 2, wherein the each of R1 and R2 is hydrogen or alkyl having 1 to 4 carbon atoms, preferably methyl;
Z is a straight or branched chain alkylene having 1 to 6, preferably 1 to 4 carbon atoms;
p and j are both 2 or 3;
R3 is phenyl substituted with straight or branched chain alkyl having 7 to 10 carbon atoms.
4. The cocogem surfactant of formula (I) according to Point 1 to 3, wherein each of R1 and R2 is hydrogen;
i is 0;
R5 is methyl;
p and j are both 2;
R3 is selected from the group consisting of straight or branched chain alkyl or alkenyl having 1 to 18 carbon atoms; preferably a branched chain alkyl or alkenyl group having from 1 to 18 carbon atoms; more preferably a branched chain alkyl having 10 to 17 carbon atoms, more preferably 14 to 17 carbon atoms, or a secondary alkyl having from 14 to 17 carbon atoms, or an alkenyl having from 14 to 17 carbon atoms;
Z is a straight or branched, preferably branched chain alkylene group having 1 to 10, preferably 1 to 7 carbon atoms, containing $(PO)_m$ groups wherein PO is a propylene oxide group, i.e. $-CH(CH_3)CH_2O-$, and m is an integer of 1 to 5, preferably 2 to 4, more preferably 2 to 3.

5. The cocogem surfactant of formula (I) according to Point 1 to 2, wherein the each of R1 and R2 is hydrogen or an alkyl having 1 to 4 carbon atoms, preferably methyl;

Z is a straight or branched chain alkylene having from 1 to 7, preferably from 1 to 4, more preferably from 2 to 4 or 3 carbon atoms;

p and j are both 2 or 3;

R3 is selected from the group consisting of straight or branched chain alkyl or alkenyl having 1 to 18 carbon atoms; preferably a branched chain alkyl or alkenyl group having from 1 to 18 carbon atoms; more preferably a branched alkyl group having 10 to 17 carbon atoms; even more preferably a secondary alkyl group having 14 to 17 carbon atoms;

i is 1; and

R5 is hydrogen.

6. Process for the preparation of cocogem surfactants according to Points 1 to 5, wherein starting materials A, B and C are reacted in a ratio of 2A+B or 3A+B in the presence of C with the removal of the neutralization heat formed, wherein reactant A is the compound of formula An-R3 as defined in formula (I) or an alkali metal salt thereof;

reactant B is the diamine or triamine or the salt thereof of formula [R1R2NHR5zR5NHR1R2]$^{p+}$ as defined in formula (I), wherein R1, R2, R5, z are and p is as defined in Point 1; and C is the protic solvent required for the neutralization reaction, thus, a stock solution of the cocogem surfactant product of Point 1 is obtained.

7. The process according to Point 6, wherein reactant A is selected from the group consisting of sulfonic acids, carboxylic acids, preferably alkylbenzenesulfonic acids, sec-alkylsulfonic acids, alpha-olefin sulfonic acids, alkylcarboxylic acids, more preferably oleic acid, or salts thereof with an alkali metal; and solvent C is selected from the group consisting of alcohols having 1 to 6 carbon atoms, ethers, and diols, such as butoxyethanol, butyl ether, isobutanol, diethylene glycol, momoethers of propylene glycol, or water.

8. Use of one or more of the cocogem surfactants according to any of Points 1 to 5, or the cocogem surfactants prepared by Points 6 or 7 for an enhanced oil recovery process.

DETAILED DESCRIPTION OF THE INVENTION

For the purposes of the present invention, the term "monomeric surfactant", a "tenside monomer", or a "surfactant monomer" shall mean a molecule comprising a hydrophobic and a hydrophilic moiety, called an ionic or non-ionic surfactant based on the hydrophilic moiety. The ionic surfactant is called anionic or cationic surfactant based on the charge of the hydrophilic moiety, i.e. the head group.

For the purposes of the present invention, the term "gemini surfactant" shall mean a molecule in which two monomeric surfactants are coupled by a small group called the "spacer" with a covalent bond.

For the purposes of the present invention, the terms "gemini surfactant" and "classic gemini surfactant" are used interchangeably.

For the purposes of the present invention, the term "cocogem surfactant" shall mean a molecule in which two or more ionic monomeric surfactants are coupled by a "spacer" carrying charges opposite the head group of said monomeric surfactants by ionic/electrostatic manner.

For the purposes of the present invention, the term "critical concentration for micelle formation" shall mean the minimum surfactant concentration in the solution, where spontaneous aggregation occurs, i.e., micelle formation begins.

For the purposes of the present invention, the term "diphenyl ether" shall mean a group in which two phenyl groups are linked by an oxygen atom.

For the purposes of the present invention, the term "alkenyl" shall mean a hydrocarbon group containing single one double bond.

For the purposes of the present invention, the term "alkadienyl" shall mean a hydrocarbon group containing two double bonds.

For the purposes of the present invention, the term "alkatrienyl" shall mean a hydrocarbon group containing three double bonds.

For the purposes of the present invention, the term "aromatic group" shall mean an unsaturated ring having 6 to 10 carbon atoms, containing formally consistently conjugated double bond system, containing one or two rings, wherein the two rings may be fused or isolated.

For the purposes of the present invention, the term "sulfonic acid" shall include: a saturated or unsaturated, linear or secondary alkyl or alkenylbenzene sulfonic acids, alpha-olefin sulfonic acids, having 1 to 20 carbon atoms, preferably having 1 to 17 carbon atoms, more preferably having 1 to 12 carbon atoms or having 14 to 17 carbon atoms, but not limited thereto.

Accordingly, the skilled person is able to determine the sulfonic acids which may be used within the scope of the invention without undue experimentation.

For the purposes of the present invention, the term "carboxylic acid" includes, but is not limited to, saturated or unsaturated, linear or secondary alkylcarboxylic acids having 1 to 20 carbon atoms such as, in particular, oleic acid.

For the purposes of the present invention, the term "alkali metal salt" shall mean a salt of an organic acid such as a carboxylic acid or a sulfonic acid with an element, which is a member of the main group I of the Periodic Table, preferably with sodium or potassium.

The present invention relates to the following anionic cocogem surfactant of formula (I)

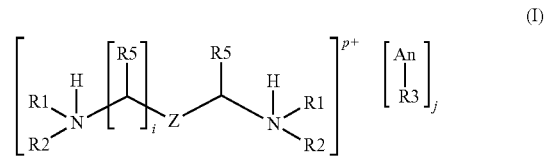

(I)

wherein in the formula each R1 and R2 is independently selected from hydrogen; or straight or branched chain alkyl having 1 to 18 carbon atoms, optionally substituted with hydroxy;

each R3 is independently selected from hydrogen; a straight or branched chain alkyl or alkenyl group having from 1 to 25 carbon atoms, optionally containing an interchain amido group; an aromatic group optionally substituted with a straight or branched chain alkyl group having 1 to 25, preferably 5 to 20, more preferably 5 to 15 carbon atoms, preferably selected from the group consisting of phenyl and diphenyl ether; or a straight or branched alkenyl, alkadienyl or alkathienyl group having 10 to 20 carbon atoms;

Z is a straight or branched chain alkylene group having 1 to 18 carbon atoms, optionally substituted with one or two alkyl having 1 to 6 carbon atoms, or preferably cycloalkyl having 3 to 6 carbon atoms, optionally containing $(EO)_n$ and/or $(PO)_m$ groups; where EO is ethylene oxide, i.e. —$CH_2CH_2O$—, and PO is propylene oxide, i.e. —$CH(CH_3)CH_2O$—, wherein n and m are independently integers of 0 to 30 (preferably 0-25, 0-20, 0-15, 0-10, 1-25, 1-20, 1-15, 1-10, 2-25, 2-20, 2-15, 2-10) and n+m is an integer of 1 to 30 (preferably 1-25, 1-20, 1-15, 1-10, 2-25, 2-20, 2-15, 2-10, 3-25, 3-20, 3-15, 3-10); and/or $[NH(R4)]^+$ quaternary ammonium, wherein R4 is hydrogen, alkyl having 1 to 6 carbon atoms, preferably methyl or ethyl;

R5 is hydrogen or alkyl having 1 to 6 carbon atoms, preferably methyl or ethyl;

An is selected from one or more groups selected from the group consisting of $SO_3^-$, $Cl^-$ or $CO_2^-$;

i is 0 or 1;

p is an integer of 2 or 3;

j is an integer of 2 or 3;

with the proviso that when

R1 and R2 are both H; and

Z is $(PO)_m$—$CH_2$, wherein m is 1-5 and i is 0; and

R5 is methyl; and

An is $SO_3^-$;

then R3 is other than —$CH(CH_3)$—$(CH_2)_{7-10}$—$CH_3$.

The preferred embodiments of the above substituents are specified in the "Brief description of the invention" above. Other preferred embodiments of the invention include those compounds in which in formula (I)

R1 and R2 are independently hydrogen; methyl or straight chain hydroxy substituted alkyl having 1 to 3 carbon atoms.

Other preferred embodiments of the invention include those compounds in which in formula (I)

Z is a straight or branched chain alkylene having 1 to 6, preferably 1 to 4, more preferably 2 to 4 or 3 carbon atoms;

p and j are both 2 or 3;

R3 is phenyl substituted with straight or branched alkyl having 7 to 10 carbon atoms.

Other preferred embodiments of the invention include those compounds in which in formula (I)

R1 and R2 are hydrogen;

i is 0;

R5 is methyl;

p and j are both 2;

R3 is branched alkyl having 14 to 17 carbon atoms or secondary alkyl having 14 to 17 carbon atoms or alkenyl having 14 to 17 carbon atoms; and Z is a branched alkylene group having 1 to 7 carbon atoms, containing $(PO)_m$ groups and m is an integer of 2 to 3.

Other preferred embodiments of the invention include those compounds in which in formula (I)

R1 and R2 are hydrogen or methyl;

Z is a straight or branched chain alkylene having from 1 to 4 carbon atoms;

p and j are both 2 or 3;

R3 is secondary alkyl having from 14 to 17 carbon atoms;

i is 1; and

R5 is hydrogen.

The particular properties of the cocogem surfactants of the present invention are due to their specific structure. The cocogem surfactant of the present invention is capable of lowering the water-to-oil interfacial tension at low concentrations to a lower value compared to known anionic surfactants, even to $10^{-3}$-$10^{-2}$ mN/m. The low interfacial tension does not increase significantly even if the surfactant concentration is increased up to 1.5% by weight or in the case of significant dissolved salt content.

The surfactant concentration required for the formation of the cocogem surfactant according to the invention is preferably very small, 0.1-0.5% by weight.

We have discovered that if the molecular structural properties of the monomeric surfactants used for the cocogem surfactant of the present invention are selected according to the following rules, then a highly heat-stable and balanced high-potency combination of action properties in aqueous solutions can be achieved, which was not previously possible with the known surfactants:

a) The oleophilic, alkyl, or alkylaryl group of the surfactant monomer used to prepare the cocogem surfactants of the present invention has preferably ca. 18 carbon atoms, and is preferably a linear chain structure, which provides favorable structural conditions for the development of a more regular micelle structure.

b) In the monomeric surfactant used for the preparation of the cocogem surfactant of the present invention, the oleophilic hydrocarbon group contains 1 to 3 C=C double bonds, which allow the formation of binding forces between the oleophilic chains in the internal structure of the micelles formed in the aqueous solution.

The present invention further relates to a method for producing the cocogem surfactants of the present invention.

General options for said production process:

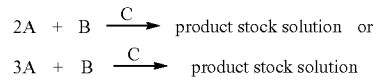

wherein the reactant A is the sulphonic acid or carboxylic acid as defined in formula (I), and the sulfonic acids and carboxylic acids specifically described in the non-limiting examples; reactant B is diamine or triamine as defined in formula (I); and C is a protic solvent required for the neutralization reaction. It is understood that if the reactant A is of diamine structure (i.e., Z is other than $[NH(R4)]^+$ quaternary ammonium group, then the 2A+B ratio should be used in the preparation, and if reactant A is of triamine structure (i.e., Z is $[NH(R4)]^+$ quaternary ammonium), the 3A+B ratio must be used in the preparation.

Reactant A mentioned in the production process is preferably selected from commercially available sulphonic acids, carboxylic acids, more preferably alkylbenzenesulphonic acids, sec-alkylsulphonic acids, alpha-olefin sulphonic acids, alkylcarboxylic acids, more preferably oleic acid, or their alkali metal salts.

Reactant B mentioned in the production process is preferably selected from commercially available diamines or triamines.

The solvent C mentioned in the production process is preferably selected from the group consisting of: alcohol having 1 to 6 carbon atoms, diols having 1 to 6 carbon atoms, derivatives thereof, such as diethylene glycol or propylene glycol, or water.

Examples of said diamines include, but are not limited to, the following diamine derivatives produced by Huntsman:

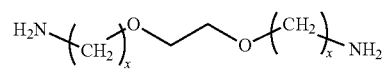

| JEFFAMINE® | x | MW |
| EDR-148 (XTJ-504) | 2.0 | 148 |
| EDR-176 (XTJ-590) | 3.0 | 176 |

-continued

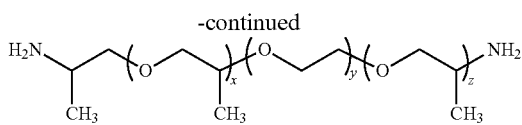

| JEFFAMINE® | y | x + z | MW* |
|---|---|---|---|
| HK-511 | 2.0 | -1.2 | 220 |
| ED-600 (XTJ-500) | -9.0 | -3.6 | 600 |
| ED-900 (XTJ-501) | -12.5 | -6.0 | 900 |
| ED-2003 (XTJ-502) | -38 | -6.0 | 2,000 |

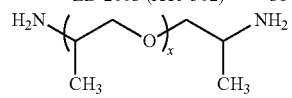

| JEFFAMINE® | x | MW* |
|---|---|---|
| D-230 | -2.5 | 230 |
| D-400 | -6.1 | 430 |
| D-2000 | -33 | 2,000 |
| D-4000 (XTJ-510) | -68 | 4,0000 |

Said production process includes one of the following steps:
a) neutralization reaction (salt formation); the combination of the corresponding sulphonic acid or carboxylic acid with diamine or triamin in the presence of a protic solvent;
b) mixing the salt of the sulfonic acid or carboxylic acid with an alkali metal in the presence of an optimum solvent and the salt (such as the hydrochloric acid salt) of the diamine or triamine.

In the following, the invention will be illustrated by means of exemplary embodiments which, however, are not to be construed as limiting the invention.

The following examples serve to prepare mixtures of cocogem surfactants. If the separation of the cocogem surfactant mixture obtained in the individual examples into its components is required in each of the examples, the separation may be carried out by a method or more than one methods of separation known by a person skilled in the art.

In the following examples, the following materials were used:
Solfodac AC-3-H (manufactured by SASOL)
According to the manufacturer's data sheet, the above substance is a mixture of sec-alkylbenzene sulphonic acids of the following general formula (CAS No. 85536-14-7, EC No: 287-494-3):

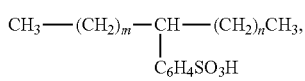

wherein m and n are independently integers of 0 to 10, and m+n is an integer of 7 to 10.
More details:
Appearance at 25° C.: liquid
Anionic active ingredient Content (MVW=320): ≥96.5% by weight
Non-sulphonated material content: ≤2.5% by weight
Water content (Karl-Fischer): ≤0.50% by weight
Sulphuric acid content: ≤1.2%
JEFFAMINE D-230 Polyetheramine (Manufacturer: HUNTSMAN)
According to the manufacturer's data sheet, the above substance is a mixture of diamines of the following general formula (average molecular weight: 230):

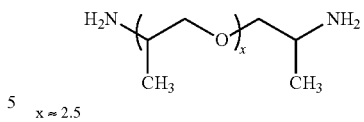

$x \approx 2.5$

More details:
Appearance: liquid
Primary amine content relative to total amine content: min. 97%
Total Amine Content: 8.1-8.7 meq/g
Water content: max. 0.20% by weight
JEFFCAT Z-130 (by Huntsman):
According to the manufacturer's data sheet, the above substance is the triamine according to the following formula:

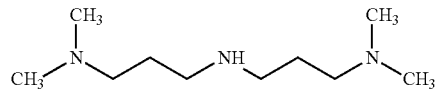

N'-(3-(dimethylamino)propyl)-N,N-dimethyl-1,3-propane-diamine
Hostapur SAS 60 (manufactured by Clariant)
According to the manufacturer's data sheet, the above substance is a mixture of sodium salts of sec-alkyl sulphonic acids of the following formula (CAS No. 97489-15-1):

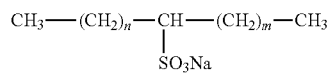

where m and n are independently integers of 0 to 14 and m+n is an integer of 11-14.
More details:
Appearance at 25 C.°: soft paste
Average molecular weight: 328 g/mol
Average carbon number: 15.5
Active ingredient content: 60±0.5%
Sodium sulphate content: max. 4.0%
Paraffin content: max. 0.5%
Hostapur OS liquid (manufactured by Clariant)
According to the manufacturer's data sheet, the above substance is a mixture of sodium salt of alpha-olefin sulphonates having 14 to 16 carbon atoms (CAS No: 068439-57-6).
More details:
Appearance at 25° C.: liquid
Dry matter content: approx. 42% in water
Sodium sulphate content: max. 3%
Measurement of water solubility in the following examples: The test substance is dissolved in 1% concentration in the model water, the pH is adjusted, and then turbidity measured by a spectrophotometer. For the test, the prepared surfactant solution samples were filled into a clean, dry cuvette and then scattered in a spectrophotometer at 500 nm wavelength using a nephelometric pad at ambient temperature. The turbidity of the sample to be tested is compared to the light scattering of pure water (0%) and the reference opal body (100%).
Measurement of oil solubility in the following examples: The substance to be tested is dissolved in 1% concentration in the model oil (MOL Rt. Refinery SN-350/A), and then measured with a spectrophotometer to measure the oil turbidity. In the course of the test, 0.2 g of the surfactant to be tested is weighed into 20 g of model oil and then dissolved for 1 hour at 60° C. with vigorous stirring. After cooling, the samples were poured into a clean, dry cuvette and then scattered at 500 nm with a spectrophotometer at ambient temperature. As reference, the light scattering of pure oil (0%) and standard opal body (100%) is used.

Measurement of emulsification effects in the following examples: The test is based on a weighing together a specified amount of the crude oil to be tested and a pH-adjusted aqueous solution containing the additive, shaking the phases, then measuring the amount of phases formed, and determining the thermal stability of the emulsion formed by using heat treatments. During the test procedure, a 10 cm$^3$ aqueous solution containing 1% emulsifier and 10 cm$^3$ of crude oil were added successively to the measuring cylinder. Shake at room temperature with 7 full-cycle turns, then when 30 minutes and 60 minutes have passed, read the amount of aqueous phase and intermediate (emulsion) phase. The tube was sealed with a stopper, placed in a thermostat at 80° C., shaken again, and the number of phases re-read after 60 minutes. The measurement data are expressed as volume % of the total volume of liquid for the aqueous and emulsion phases.

Thin layer chromatography measurement of the oil displacement effect shown in the following examples: During the measurement, a specified amount of the crude oil to be tested is dropped onto the pre-prepared layer, and then in model water containing 1% of emulsifier with a pH set to 8.0 and 8.5 with a composition which corresponds to that of the water in the oil reservoir, said crude oil is run. The displacement of the upper edge of the oil spill from the center of the droplet is determined in mm unit. To prepare the assay procedure, the thin layer is first prepared. The clean, dry glass plate was dipped in a chloroform suspension containing Csurgó white quartz sand or a primer of Algyő seed sample vigorously shaken for 4-5 minutes (60-65 cm$^3$ of chloroform was added to a 100 g layer forming material), and the layer was allowed to dry for 20 minutes. Then 4 µl of crude oil was dropped at 2 cm from the bottom of the glass plate. After spreading the oil spill and drying for 30 minutes, measure the radius of the patch in mm towards the run. 15 cm$^3$ of the model water containing 1% additive is poured into the cylindrical test tube, the glass plate is inserted, and the tube is sealed with aluminum foil. After 3 hours of run, the plate is removed from the tube and the distance between the droplet and the edge of the oil spill is measured. Measure the distance again after 24 hours storage at room temperature and air. In both cases, the result is obtained by subtracting from the 3 or 24 hour values the measured value measured prior to the elution run. Measured displacements are given in mm units.

The method of determining the interfacial tension in the following examples is based on the principle that the liquid forms droplets, which size is dependent on the interfacial tension and density of the liquid, when dripping from a glass tube being equipped with a specially designed capillary constriction, known as Traube stalagmometer. The droplet drop occurs when the weight of the increasing drop is equal to the surface force measured on the lower disk of the stalagmometer. The interfacial tension can be calculated by knowing the density, volume, the number of droplets of the liquid and the size of the disc of the stalagmometer.

The method used to determine the stalagnometric CMC value in the following examples: after the stalagmometric measurement of the interfacial tension of surfactant solutions of varying concentrations the interfacial tension values determined are graphically illustrated as a function of the concentration of the surfactant solution. By increasing the concentration of surfactant solution, the steep decrease in interfacial tension at the CMC is eliminated, as the concentration of individual surfactant molecules is constant at concentrations above CMC. The stalagnometric determination of CMC is done by determining the inflection point of the interfacial tension-surfactant concentration graph.

To measure the microcalorimetric CMC values according to the following examples, a titration microcalorimeter containing both VP-ITC (Microcal, USA) reference and measurement cells is used. During the thermal examination of the micelle formation, a liquid of the same composition as the solvent of the titrating solution is charged in the measuring cell in a microliter scale using a computer controlled microtiter. The syringe needle of the microtiter is a metal capillary with a stirrer blade through which the titration solution is transferred to the measuring cell. If an exothermic or endothermic process occurs in the measuring cell, then there is a change in the performance of the heating/cooling system to equalize the temperature between the measuring cell and the reference cell. The enthalpy data is calculated from the titration curve obtained by the measurement and plotted against the concentration of surfactant charged in the measuring cell. The resulting points are fitted with an S-curve and the CMC value is calculated from the fitting parameters obtained.

The interfacial tension (IFT) in the following examples is measured in a spinning drop type tensile meter at 4500 rpm at 40° C. temperature. The test capillary was filled with various concentrations of surfactant solution into which a drop of oil of Algyő type oil was injected through a syringe. In steady state, the interfacial tension between the surfactant solution and the crude oil can be calculated based on the geometric dimensions of the droplet taken by the oil drop.

EXAMPLES

The following are Examples 1 to 2 are for the preparation of mixtures of cocogem surfactants, which are composed of a 2:1 salt of 4-($C_{10}$-$C_{13}$ sec-alkyl)-benzenesulphonic acid, typically 90% $C_{12}$ alkyl (CAS No. 85536-14-7, EC number: 287-494-3) and various diamines, or 3:1 salt of 4-($C_{10}$-$C_{13}$ sec-alkyl)-benzenesulphonic acid, typically 90% $C_{12}$ alkyl (CAS No. 85536-14-7, EC number: 287-494-3) and various triamines.

Example 1

Preparation of a solution of 2-methylpentane-1,5-diammonium-bis(4-(sec-alkyl)-benzene-sulphonate) in 70% i-butanol.

163.3 g (0.5 mol) of 4-(sec-alkyl)-benzene sulphonic acid (Solfodac AC-3-H SASOL) were charged into a 500 ml flask equipped with a magnetic stirrer, a reflux condenser and a feed funnel, and 82.0 g of i-BuOH was charged in it. The mixture was stirred for 20 minutes while the temperature rose to 40° C. Then, 29.0 g (0.25 mol) of 1,5-diamino-2-methylpentane (Aldrich) was added over 10 minutes, while the temperature rose from 40° C. to 60° C. The mixture was stirred for an additional two hours, while the pH was adjusted to 7 with an additional 3.0 g of amine. Thus, 277.0 g of 70% stock solution was prepared.

The compounds of the invention which form the product mixture obtained by the above process have the following general formula:

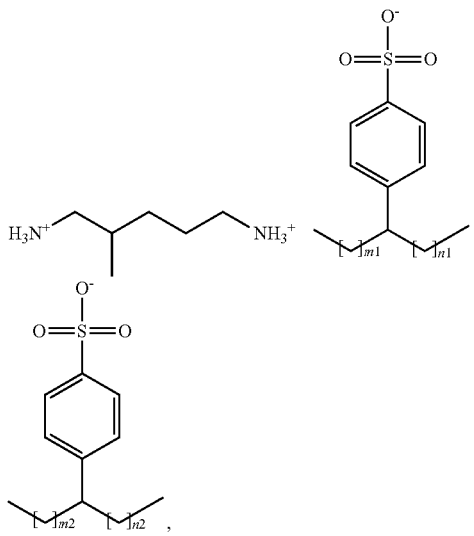

wherein m1+n1=7-10, m2+n2=7-10 and m1, m2, n1 and n2 are independently integers of 0 to 10.

A representative member of the above product mixture is the following compound:

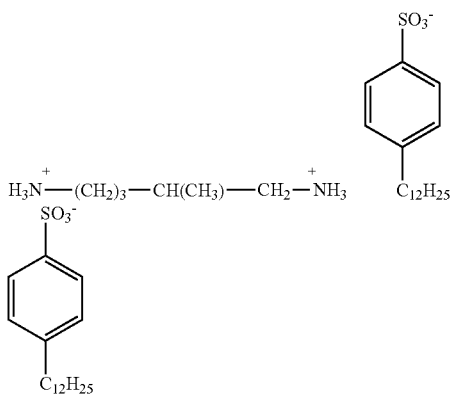

wherein $C_{12}H_{25}$ means n-dodecyl.
Characteristics of the former representative compound:
Molecular Weight: 769.2
Purity: 94
Thermal stability (90° C., 3 hours): 100% milky
Water solubility: 100% milky
Oil solubility: 5% partial
Emulsifying effect: (% emulsion phase):
At ambient temperature after 1 hour: 0
At 80° C. after 24 hours: 20
Oil displacement effect:
A, measured by paper chromatography (mm): 15
B, measured by thin layer chromatography (mm): 03 h: 13.5
24 hours: 15.5
Instrumental Measurement Results:
CMC (g/l): 0.164
Surface tension (c=1%) (mN/m): 26.5
Interfacial tension (c=1 g/l) (mN/m): 0.008

Example 2

Preparation of 3,3'-imino-bis(N,N-dimethylpropylammonium)-tris(4-(sec-alkyl)-benzene-sulphonate) in 70% i-butanol.

158.4 g (0.485 mol) of 4-(sec-alkyl)-benzene sulphonic acid (Solfodac AC-3-H SASOL) was weighed into a 500 ml flask equipped with a magnetic stirrer, reflux condenser and addition funnel, and 81.6 g of isobutanol was added. The mixture was stirred for 20 minutes, while the temperature rose to 45° C. Then, 30.7 g (0.16 mol) Jeffcat Z-130 (Huntsman) was added over 10 minutes, while the temperature rose from 45° C. to 65° C. The mixture was stirred for an additional two hours, while the pH was adjusted to 7 with an additional 2.0 g of amine. Thus, 271.0 g of 70% stock solution was prepared.

The compounds of the invention which form the product mixture obtained by the above process have the general formula:

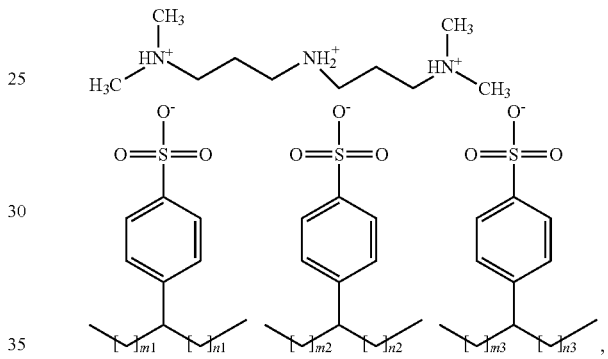

wherein m1+n1=7-10, m2+n2=7-10, m3+n3=7-10 and m1, m2, m3, n1, n2 and n3 are independently integers of 0 to 10.

A representative member of the above product mixture is the following compound:

(CH$_3$)$_2$NH+—NH$_2$+—NH+(CH$_3$)$_2$

SO$_3^-$

[benzene ring with $C_{12}H_{25}$] × 3

Characteristics of the above representative compound:
Molecular Weight: 1167
Purity: 92%
Thermal stability: (90° C., 3 hours): 100, milky
Water solubility: 100, milky.
Solubility in oil: 14, bright.
Emulsifying effect: (% emulsion phase):
At ambient temperature after 1 hour: 2.5
At 80° C. after 24 hours: 12.5
Oil displacement effect:
A, measured by paper chromatography (mm): 8
B, measured by thin layer chromatography (mm): 03 h: 9.5
24 hours: 9.5

Instrumental Measurement Results:
CMC (g/l): 0.23
Surface tension (c=1%) (mN/m): 28.6
Interfacial tension (c=1.0 g/l) (mN/m): 0.21

The following Examples 3 to 5 are for the preparation of mixtures of cocogem surfactants characterized in that they are composed of ($C_{14}$-$C_{17}$ sec-alkyl) sulphonic acid (CAS No. 97489-15-1) a 2:1 proportion salt of ($C_{14}$-$C_{17}$ sec-alkyl) sulphonic acid (CAS No. 97489-15-1) and various diamines or a 3:1 proportion salt of ($C_{14}$-$C_{17}$ sec-alkyl) sulphonic acid (CAS No. 97489-15-1) and various triamines.

Example 3

Preparation of bis($C_{14}$-$C_{17}$ sec-alkyl)-sulphonate-poly(propylene-glycol)-bis-(2-ammonium-propyl)-ether salt (IUPAC: 0,0'-bis(2-aminopropyl)polypropylene-glycol-bis($C_{14}$-$C_{17}$ sec-alkane-sulphonate)] solution in 70% i-butanol.

327.9 g (0.6 mole) of Hostapur SAS-60 (Na-salt of [($C_{14}$-$C_{17}$ sec-alkyl)-sulphonic acid) was weighed into a 1000 ml flask equipped with a magnetic stirrer, reflux condenser and addition funnel, and 300.0 ml of water was added. After dissolution, 30.0% hydrochloric acid (73.0 g, 0.6 mol) was added dropwise over 10 minutes, followed by the addition of 69.0 g (0.3 mol) of Jeffamine D-230 in portions. The reaction mixture slightly heated and was stirred for 30 minutes. 300 ml of dichloromethane was then added, and the mixture is stirred for 1 hour. The two phases are separated in a separator funnel, the dichloromethane phase is dried and concentrated under reduced pressure. This gave 240 g (95.0%) of surfactant, to which 103.0 g of i-butanol was added to obtain 70.0% of stock solution.

The compounds of the invention which form the product mixture obtained by the above process have the general formula:

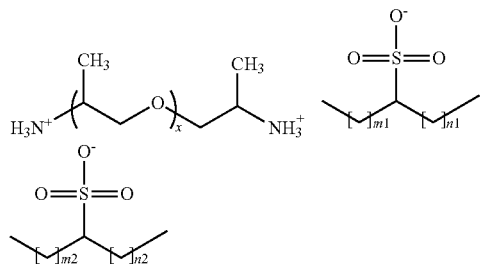

where x is about 2.5, m1, n1, m2 and n2 are independently integers of 0 to 14 and m1+n1=11-14 and m2+n2=11-14.

Characteristics of the product mixture produced:
Average molecular weight: 842
Purity: 95%
Thermal stability: (90° C., 3 hours) 4% (bright)
Water solubility: 4%
Oil solubility: insoluble
Emulsifying effect: (% emulsion phase):
Cold after 24 hours: 5 (microemulsion)
At 80° C. after 24 hours: 2 (microemulsion)
Oil displacement effect:
A, measured by paper chromatography (mm): 12
B, measured by thin layer chromatography (mm): 03 h: 0
24 hours: 3
Instrumental Measurement Results:
CMC (g/l): 0.018
Surface tension (c=1%) (mN/m): 29.0
Interfacial tension (c=0.1 g/l) (mN/m): 0.011

Example 4

Preparation of a 56% aqueous solution of bis($C_{14}$-$C_{17}$ sec-alkyl)-sulphonate)-poly(propylene glycol)-bis(2-ammonium propyl)-ether salt.

546.5 g (1.0 M) of Hostapur SAS 60% aqueous solution [($C_{14}$-$C_{17}$ sec-alkyl)-sulphonic acid sodium salt] (328, 0 g of active ingredient, 218.6 g of water) and water were charged into a 1000 ml flask equipped with a magnetic stirrer, reflux condenser and addition funnel. After dissolution, 121.5 g (1.0 M) of 30% solution of 30% HCl solution (36.5 g, 85.0 g of water) was added dropwise over 10 min, and 123.0 g (0.535 M) of Jeffamine D230 was added portionwise. The reaction mixture is slightly heated and it was stirred for 30 minutes. This gave 791.0 g of aqueous stock solution where cc. 56.0% of the surfactant of the invention, 7.4% NaCl and 36.6% water are present.

The compounds of the present invention which form the product mixture of this example are the same as those obtained in the previous example.

Example 5

Preparation of a solution of 2-methylpentane-1,5-diammonium-bis($C_{14}$-$C_{17}$ sec-alkylsulphonate) in aqueous i-butanol.

To a 500 ml flask equipped with a magnetic stirrer, reflux condenser and addition funnel, 273.25 g (0.5 mol) of Hostapur SAS-60, the Na salt of [($C_{14}$-$C_{17}$ sec-alkyl).sulphonic acid] and 82.0 g of i-BuOH was added. The mixture was stirred for 20 minutes, while the temperature rose to 40° C. Then, 29.0 g (0.25 mol) of 1,5-diamino-2-methylpentane (Aldrich) was added over 10 minutes, while the temperature rose from 40° C. to 60° C. The mixture was stirred for an additional hour. Thus, a stock solution of 384.25 g was prepared.

The compounds of the invention which form the product mixture obtained by the above process have the general formula:

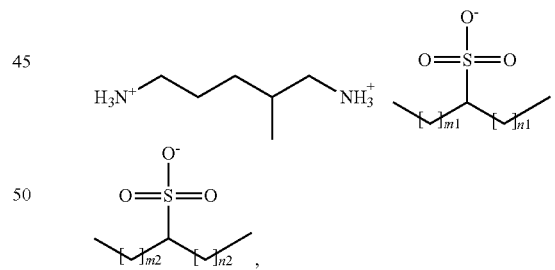

where m1, n1, m2 and n2 are independently integers of 0-14 and m1+n1=11-14 and m2+n2=11-14.

Characteristics of the product mixture produced:
Average molar weight: 728
Purity: 90%
Thermal stability (90° C., 3 hours): 80.0
Water Solubility: 100%
Oil solubility: insoluble
Emulsifying effect: (% emulsion phase):
At ambient temperature after 1 hour: 100
At 80° C. after 24 hours: 60

Oil displacement effect:
A, measured by paper chromatography (mm): 12
B, measured by thin layer chromatography (mm): 03 h: 7.0
24 hours: 7.5
Instrumental Measurement Results:
CMC (g/l): 0.12
Surface tension (c=1.0 g/l) (mN/m): 22.5
Interfacial tension (c=1.0 g/l) (mN/m): 0.170

Example 6 below serves the preparation of a mixture of cocogem surfactants characterized by that they are composed of the 2:1 proportion salt of ($C_{14}$-$C_{16}$ alpha-olefin)-sulphonic acid (CAS No. 68439-57-6) and various diamines or the 3:1 proportion salt of ($C_{14}$-$C_{16}$ alpha-olefin)-sulphonic acid (CAS No. 68439-57-6) and various triamines.

Example 6

Preparation of a 35.2% aqueous solution of bis-($C_{14}$-$C_{16}$alpha-olefin)-sulphonate-poly(propylene-glycol)-bis(2-ammonium propyl)-ether salt (IUPAC name: O,O'-bis(2-aminopropyl)polypropylene-glycol)-bis(alpha-olefin sulphonate)].

Into a 1000 ml flask equipped with a magnetic stirrer, reflux condenser and addition funnel, 123.75 g (0.15 M) 42% aqueous solution of Hostapur OS liquid (52.0 g, 71.75 g water) and water was added. After dissolution, 18.15 g (0.15 M) of 30% HCl (5.45 g of active ingredient, 12.7 g of water) was added dropwise over 10 minutes, and 18.45 g (0.08 M) of Jeffamine D230 was added in portions. The reaction mixture slightly heated and was stirred for 30 minutes. This gave 159.40 g of an aqueous stock solution, which contained cc. 35.2% of the surfactant according to the invention, 5.5% NaCl and 59.25% water.

The compounds of the invention which form the product mixture obtained by the above process have the general formula

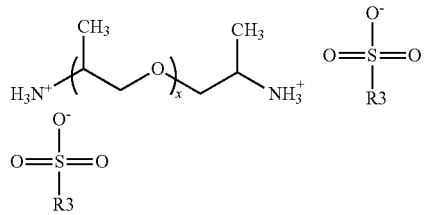

wherein x is about 2.5 and R3 is $C_{14}$-$C_{16}$ alpha-olephin.

Characteristics of the product mixture produced:
Average molar weight: 846
Purity: 90%
Thermal stability (90° C., 3 hours): 3%
Water solubility: 3%
Oil solubility: 3%
Emulsifying effect: (% emulsion phase):
At ambient temperature after 1 hour: 27.5
At 80° C. after 24 hours: 47.5
Oil displacement effect:
A, measured by paper chromatography (mm): 11
B, measured by thin layer chromatography (mm): 03 h: 7.5
24 hours: 9
Instrumental Measurement Results:
CMC (g/l): 0.334
Surface tension (c=1%) (mN/m): 35.69
Interfacial tension (c=1 g/l) (mN/m): 0.180

The following Example 7 is used to prepare mixtures of cocogem surfactants characterized by that it is composed by a 2:1 proportion salt of oleic acid (cis-9-octadecanoic acid, CAS No. 112-80-1) and various diamines, or a 3:1 proportion salt of oleic acid (cis-9-octadecanoic acid, CAS No. 112-80-1) and various triamines.

Example 7

Preparation of bis(oleate)-poly(propylene-glycol)-bis(2-ammonium-propyl)-ether salt (IUPAC name: O,O'-bis(2-aminopropyl)-polypropylene-glycol-bis(cis-9-octadecanoate) anionic gemini surfactant.

282.5 g (1.0 M) of oleic acid (Aldrich) was added to a 1000 mL three-necked flask equipped with magnetic stirrer, reflux condenser and addition funnel, and 267.0 g of butoxethanol (BASF) was added in portions at 25 rpm stirring. The mixture was stirred for 20 minutes, while a light yellow homogeneous solution was formed and the temperature increased from 20° C. to 30° C. The speed is increased to 75 rpm and without external cooling, the addition of 118.0 g (0.5 M) of Jeffamine D230 (HUNTSMAN) was started at a rate such that the temperature of the mixture does not rise to 55° C. The addition period is 20 minutes and the temperature reaches 45° C. The mixture was stirred for an additional hour, while the temperature dropped to 25° C. The stock solution containing 60% of the active compound thus obtained was m=667.5 g.

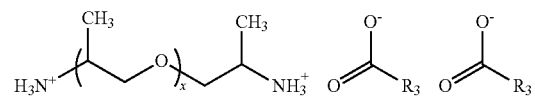

wherein x is about 2.5 and R3 is cis-8-heptadecenyl.

Further examples are given below for cocogem surfactants and their properties according to the invention.

Example 7A: Displacement Model Tests

From a 30 cm long artificial limestone made of Algyő stone mortar at 20 bar pressure and 98° C. displacement modeling studies were performed with the 15 g/l aqueous solution of the cocogem surfactants according to the above examples containing as additive 1 g/l flow modifying polymer (polyacrylamide: Flopaam AN 125 SH, Flopaam AN 125 or Flopaam 5115). On the basis of the measurements carried out, an additional oil yield of 13-16% relative to the original oil stock was achieved.

TABLE 1

Examples of additional cocogem surfactants and starting materials used for their preparation

| No. of Example | Starting diamine/triamine (A) | Starting sulphonis acid (S) | A:S | Molar weight or average molar weight |
|---|---|---|---|---|
| 8 | Jeffamine D400 | DB | 1:2 | 1053 |
| 9 | Jeffamine D400 | TPB | 1:2 | 1044 |
| 10 | Jeffamine D230 | TPB | 1:2 | 874 |
| 11 | Jeffamine D400 | K | 1:2 | 1044 |
| 1 | 2-methyl-1,5-diaminopentane | DB | 1:2 | 769 |
| 6 | Jeffamine D230 | alpha-olephin | 1:2 | 846 |
| 18 | Jeffamine D230 | K | 1:2 | 874 |
| 19 | 2-methyl-1,5-diaminopentane | K | 1:2 | 760 |

TABLE 1-continued

Examples of additional cocogem surfactants and starting materials used for their preparation

| No. of Example | Starting diamine/triamine (A) | Starting sulphonis acid (S) | A:S | Molar weight or average molar weight |
|---|---|---|---|---|
| 20 | 2-methyl-1,5-diaminopentane | TPB | 1:2 | 760 |
| 5 | 2-methyl-1,5-diaminopentane | sec-alkane | 1:2 | 728 |
| 21 | 1,6-hexane-diamine | DB | 1:2 | 769 |
| 22 | c.hexyl | DB | 1:2 | 795 |
| 23 | 1,4-buthane-diamine | DB | 1:2 | 741 |
| 24 | 4,9-dioxa-1,12-dodecane-diamine | DB | 1:2 | 857 |
| 33* | (PO)$_{xyz}$—N | DB | 1:3 | 1419.5 |
| 34* | (PO)$_{xyz}$—N | 2DB + HCl | 1:3 | 1129.5 |
| 35* | (PO)$_{xyz}$—N | TPB | 1:3 | 1406 |
| 37* | (PO)$_{xyz}$—N | sec-alkane | 1:3 | 1358 |
| 2** | TMDPT | DB | 1:3 | 1167 |
| 38** | TMDPT | 2DB + HCl | 1:3 | 877 |

Abbreviations used in the table:
DB: n-dodecylbenzene-sulphonic acid (Lutensit A-LBS, BASF AG.)
TPB: sec-alkylbenzene-sulphonic acid (Ufacid TPB, Unger A. S.)
K: linear alkylbenzene-sulphonic acid (Ufacid-K, Unger A. S.)
sec-alkane: (C14-C17-sec-alkyl)-sulphonic acid (Hostapur SAS 60, Clariant GmbH.)
alpha-olefin: (C12-C14 alpha-olefin)-sulphonic acid (Hostapur OS liquid, Clariant GmbH.)
*30% aqueous solution
c.hexyl: cyclohexylbis-methylenamine
*(PO)$_{xyz}$—N: Jeffamine polyoxyalkyl-triamine (T-403 Huntsman Corp.) with the following structure:

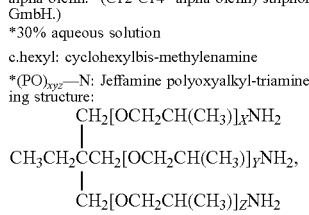

where x + y + z = 5 (average molecular weight: 440)
**TMDPT: tetramethyl dipropylene triamine (Z-130 Huntsman Corp.) with the following structure:

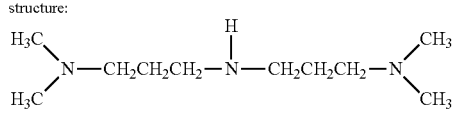

TABLE 2

Physical chemical characteristics of examples of cocogem surfactants in Table 1

| No. of Example | surface tension (mN/m) stal. | CMC (g/l) stal. 25° C. | CMC (g/l) mcal. 25° C. | CMC (g/l) mcal. 40° C. | IFT (mN/m) 0.1 g/l | IFT (mN/m) 1.0 g/l | IFT (mN/m) 5.0 g/l |
|---|---|---|---|---|---|---|---|
| 8 | 27.10 | 0.172 | 0.043 | 0.190 | 0.100 | 0.160 | 0130 |
| 9 | 26.10 | 0.169 | 0.164 | 0.141 | 0.044 | 0.120 | 0.094 |
| 10 | 33.93 | 0.175 | 0.279 | 0.170 | 0.015 | 0.012 | |
| 11 | 25.60 | 0.125 | 0.144 | 0.0735 | 0.074 | 0.100 | 0.055 |
| 1 | 26.50 | 0.164 | — | — | 0.1 | 0.008 | |
| 6 | 35.69 | 0.334 | 0.170 | 0.115 | 0.220 | 0.180 | 0.670 |
| 18 | | | | | 0.0064 | 0.0085 | |
| 19 | | | | | 0.0032 | 0.0027 | |
| 20 | | | | | 0.021 | 0.0056 | |
| 5 | 22.5 | 0.12 | | | 0.170 | 0.170 | |
| 21 | | | | | 0.019 | 0.015 | |
| 22 | | | | | 0.057 | 0.110 | |
| 23 | | | | | 0.120 | 0.170 | |
| 24 | | | | | 0.042 | 0.103 | |
| 33 | — | — | — | — | 0.056 | 0.083 | 0.23 |
| 34 | — | — | — | — | 0.14 | 0.21 | |
| 35 | 24.90 | 0.168 | nd | nd | 0.26 | 0.17 | |
| 37 | 25.80 | 0.107 | nd | nd | 0.14 | 0.039 | 0.08 |
| 2 | 28.6 | 0.23 | — | — | 0.049 | 0.21 | 0.09 |
| 38 | — | — | — | — | 0.15 | 0.16 | | nd: not detectable
stal: stalagmometric CMC determination
mcal: microcalorimetric CMC determination

TABLE 3

Data on hydrolytic stability of examples of cocogem surfactants in Table 1 based on transmittance measurements

| No. of Example | Water solubility (%) | Heat stability (90° C., 3 hours) (%) | Solubility in oil (%) |
|---|---|---|---|
| 8 | 76, t. | 100, t. | 7, complete |
| 9 | 100, m. | 100, t. | 9, complete |
| 10 | 100, m. | 100, op. | 26, complete |
| 11 | 100, m. | 78, t. | 8, complete |
| 1 | 100, m. | 100, m. | 5, partial |
| 6 | 3, b. | 3, b. | 3, complete |
| 18* | 100, m. | 100, m. | 17, op. (r.o.) |
| 19* | 100, m. | 100, m. | n.o. |
| 20* | 100, m. | 100, m. | n.o. |
| 5* | 100, m. | 80, op. | n.o. |
| 21* | 100, m. | 100, m. | n.o. |
| 22* | 100, m. | 100, m. | n.o. |
| 23* | 100, m. | 20, b. | n.o. |
| 24* | 100, m. | 100, op. | 18, op. (r.o.) |
| 33 | 100, op. | 6, b. | 18, op. |
| 34 | 100, m. | 59, op. | 100, op |
| 35 | 100, op. | 6, b. | 2, op. |
| 37 | 100, op. | 16, b. | 68, op. (r.o.) |
| 2 | 100, m. | 100, m. | 14 b. |
| 38 | 14, m. | 31, op. | 3, op. |

Abbreviations used in the above table
m. = milky;
t. = transparent;
op. = opalescent;
b. = bright
*poor dissolvability, n.o. = non-dissolving In the following, IFT values of commercially available anionic and nonionic surfactants are provided as counter-examples.

TABLE 4

IFT values of commercially available surfactants

| Name of the commercial surfactant | IFT (mN/m) Concentration (g/l) 0.1 | 1 | 5 |
|---|---|---|---|
| DBSNa-salt 30% solution | 0.34 | 0.63 | 0.88 |
| Genapol LRO pasta | 1.5 | 1.55 | 1.45 |
| Hostapur OS | 2.20 | 1.10 | 1.24 |
| Dowfax 3B2 45% aq. solution. | 5.3 | 1.78 | 1.96 |
| Emulsogen M | 9.5 | 10.56 | 0.15 |
| Lutensol XL-80 | 1.93 | 1.07 | 0.90 |
| Lutensol ON 110 | 6.6 | 1.96 | 1.78 |
| Propylene glycol | 11.53 | 16.14 | 15.4 |

Anionic surfactants presented in the above table:
DBSNa salt: Sodium salt of dodecylbenzylsulfonic acid
Genapol LRO Paste: Sodium salt of alkyl ether sulphate (Clariant)
Hostapur OS: Mixture of sodium salt of alpha-olefin sulfonates (Clariant)
Dowfax 3B2: sodium salt of alkyl diphenyl oxide disulfonate (DOW)
Nonionic surfactants shown in the table above:
Emulsogen M: oleyl alcohol polyglycol ether (Clariant)
Lutensol XL-80: C-10 Guerbet Alcohol Polyglycol Ether (8) (BASF)
Lutensol ON 110: Short-chain Alcohol-Polyethylene Glycol Ether (BASF)

INDUSTRIAL APPLICABILITY

Using the cocogem surfactants of the present invention, the yield efficiency of the tertiary oil recovery processes (EOR) can be increased, and at the same time the reduced critical micelle formation concentration allows for a significant reduction in the active component use and cost of the chemical-based EOR.

What is claimed is:
1. An anionic cocogem surfactant according to the general formula (I) for an enhanced oil recovery process

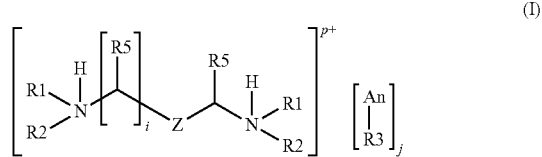

wherein
each R1 and R2 is independently selected from the group consisting of hydrogen and straight or branched chain alkyl having from 1 to 18 carbon atoms, optionally substituted with hydroxy;
each R3 is independently selected from the group consisting of hydrogen; straight or branched chain alkyl or alkenyl group having from 1 to 25 carbon atoms, optionally containing an interchain amido group; an aromatic group optionally substituted with straight or branched chain alkyl having 1 to 25 carbon atoms, said aromatic group selected from the group consisting of phenyl and diphenyl ether; and a straight or branched alkenyl, alkadienyl or alkatrienyl group having 10 to 20 carbon atoms;
Z is a straight or branched chain alkylene group having 1 to 18 carbon atoms, optionally substituted with one or two alkyl having 1 to 6 carbon atoms, or cycloalkyl having 3 to 6 carbon atoms, optionally containing $(EO)_n$ and/or $(PO)_m$ groups, wherein EO is ethylene oxide, that is —$CH_2CH_2O$—, and PO is propylene oxide, that is —$CH(CH_3)CH_2O$—, wherein n and m are independently integers from 0 to 30 and n+m is an integer from 1 to 30; and/or $[NH(R4)]^+$ quaternary ammonium, wherein R4 is hydrogen, alkyl having 1 to 6 carbon atoms;
R5 is hydrogen or alkyl having 1 to 6 carbon atoms;
An is one or more groups selected from the group consisting of $SO_3^-$, $Cl^-$ and $CO_2^-$;
i is an integer of 0 or 1;
p is an integer of 2 or 3;
j is an integer of 2 or 3;
with the provisos that
when
R1 and R2 are both H; and
Z is $(PO)_m$—$CH_2$, wherein m is 1 to 5, and
i is 0; and
R5 is methyl; and
An is $SO_3^-$;
then R3 is other than the following group

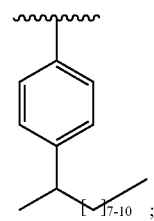

and when Z is a straight chain alkylene group having 1 to 18 carbon atoms then in at least one occurrence R5 is alkyl having 1 to 6 carbon atoms.
2. The cocogem surfactant of formula (I) according to claim 1, wherein each of R1 and R2 is independently selected from the group consisting of hydrogen; straight or branched chain alkyl having 1 to 8 carbon atoms, and straight chain alkyl having 1 to 3 carbon atoms, substituted with hydroxy.
3. The cocogem surfactant of formula (I) according to claim 1, wherein the each of R1 and R2 is hydrogen or alkyl having 1 to 4 carbon atoms;
Z is a straight or branched chain alkylene having 1 to 6 carbon atoms;
p and j are both 2 or 3;
R3 is phenyl substituted with straight or branched chain alkyl having 7 to 10 carbon atoms.
4. The cocogem surfactant of formula (I) according to claim 1, wherein each of R1 and R2 is hydrogen;
i is 0;
R5 is methyl;
p and j are both 2;
R3 is a straight or branched chain alkyl or alkenyl having 1 to 18 carbon atoms;
Z is a straight or branched chain alkylene group having 1 to 10 carbon atoms, containing $(PO)_m$ groups wherein PO is a propylene oxide group, that is —$CH(CH_3)CH_2O$—, and m is an integer of 1 to 5.
5. The cocogem surfactant of formula (I) according to claim 1, wherein the each of R1 and R2 is hydrogen or an alkyl having 1 to 4 carbon atoms;
Z is a straight or branched chain alkylene having from 1 to 6 carbon atoms;
p and j are both 2 or 3;
R3 is a straight or branched chain alkyl or alkenyl having 1 to 18 carbon atoms;
i is 1; and
R5 is hydrogen.
6. Process for the preparation of cocogem surfactants according to claim 1, characterized in that starting materials A, B and C are reacted in a ratio of 2A+B or 3A+B in the presence of C with the removal of the neutralization heat formed, wherein
reactant A is the compound of formula An-R3 as defined in formula (I) or an alkali metal salt thereof;

reactant B is the diamine or triamine or the salt thereof of formula $[R1R2NHR5zR5NHR1R2]^{p+}$ as defined in formula (I), wherein R1, R2, R5, z are and p is as defined in claim 1; and C is the protic solvent required for the neutralization reaction, thus, a stock solution of the cocogem surfactant product of claim 1 is obtained.

7. The process according to claim 6, characterized in that reactant A is selected from the group consisting of sulfonic acids, carboxylic acids, alkylbenzenesulfonic acids, sec-alkylsulfonic acids, alpha-olefin sulfonic acids, alkylcarboxylic acids, oleic acid, and salts thereof with an alkali metal; and solvent C is selected from the group consisting of alcohols having 1 to 6 carbon atoms, ethers, diols, butoxyethanol, butyl ether, isobutanol, diethylene glycol, monoethers of propylene glycol, and water.

8. A method for enhanced oil recovery, said method comprising the following steps:
   a) preparing a stock solution comprising the cocogem surfactant of claim 1 by reacting starting materials A, B and C in a ratio of 2A+B or 3A+B in the presence of C with the removal of the neutralization heat formed, wherein reactant A is the compound of formula An-R3 as defined in formula (I) or an alkali metal salt thereof; reactant B is the diamine or triamine or the salt thereof of formula $[R1R2NHR5zR5NHR1R2]^{p+}$ as defined in formula (I), wherein R1, R2, R5, Z and p are as defined in claim 1; and C is the protic solvent required for the neutralization reaction; and
   b) preparing a composition comprising the stock solution of step a); and
   c) introducing the composition of step b) into an oil storage layer.

9. The cocogem surfactant of formula (I) according to claim 1, wherein R5 is methyl or ethyl.

10. The cocogem surfactant of formula (I) according to claim 1, wherein Z is a straight or branched chain alkylene group having 1 to 18 carbon atoms, substituted with one or two alkyl having 1 to 6 carbon atoms, or cycloalkyl having 3 to 6 carbon atoms, optionally containing $(EO)_n$ and/or $(PO)_m$ groups, wherein EO is ethylene oxide, and PO is propylene oxide, wherein n and m are independently integers from 0 to 30 and n+m is an integer from 1 to 30; or $[NH(R4)]^+$ quaternary ammonium, wherein R4 is hydrogen or alkyl having 1 to 6 carbon atoms.

11. The cocogem surfactant of formula (I) according to claim 1, wherein Z is a straight or branched chain alkylene group having 1 to 18 carbon atoms, optionally substituted with one or two alkyl having 1 to 6 carbon atoms, or cycloalkyl having 3 to 6 carbon atoms, and containing $(EO)_n$ and/or $(PO)_m$ groups, wherein EO is ethylene oxide, and PO is propylene oxide, wherein n and m are independently integers from 0 to 30 and n+m is an integer from 1 to 30.

* * * * *